United States Patent
Ficinski

Patent Number: 5,935,313
Date of Patent: Aug. 10, 1999

[54] BUILDING MATERIAL

[76] Inventor: Marek B. Ficinski, 4850 Lante St., Baldwin Park, Calif. 91706

[21] Appl. No.: 09/062,572

[22] Filed: Apr. 20, 1998

[51] Int. Cl.[6] .................................................. C04B 28/36
[52] U.S. Cl. ..................................... 106/286.8; 106/286.5
[58] Field of Search ............................... 106/286.8, 286.5

[56] References Cited

U.S. PATENT DOCUMENTS

| Re. 32,454 | 7/1987 | Starbuck | 106/286.8 |
| 4,134,775 | 1/1979 | Schwoeger et al. | 106/286.8 |

FOREIGN PATENT DOCUMENTS 0048106  3/1982  European Pat. Off. ............ 106/286.8

Primary Examiner—David Brunsman
Attorney, Agent, or Firm—Robert M. Sperry

[57] ABSTRACT

Improved cement and concrete products comprising a thermoplastic cement product made of 5–35% of inorganic materials containing no carbonaceous material which have been pulverized to approximately 10 micron size and combined at a temperature of about 300° F. with 65–95% of molten sulphur to form a colloidal mass of sulphur with partly amorphous particles.

18 Claims, 1 Drawing Sheet

BUILDING MATERIAL

FIELD OF INVENTION

This invention relates to building construction and is particularly directed to improved building material which is waterproof and thermally insulating and has high compressive strength.

PRIOR ART

Throughout history, man has constantly sought to find better materials for constructing buildings, roads, sewers, sea platforms and the like. Cement and concrete have long been used for such purposes. However, the cements and concretes of the prior art have had serious disadvantages. Most cement and concrete materials have relatively low compressive and tensile strength. Thus, portland cement containing silicon has been environmentally banned, while organically polymerized sulphur cement without silica cannot achieve satisfactory compressive strength. It has been proposed to mix fibreglass into the cement to give adequate tensile strength. However, when this is done with standard portland cement, the fiberglass tends to deteriorate causing the cement to lose its tensile properties. Furthermore, when used for making sewer pipes and the like, conventional portland cement products tend to be eroded by sulphur bacteria, which is generated in sewage, and, therefore, require frequent replacement. Thus, none of the prior art cement and concrete porducts have been entirely satisfactory.

BRIEF SUMMARY AND OBJECTS OF INVENTION

These disadvantages of the prior art are overcome with the present invention and an improved cement product is provided which has very high compressive strength and which does not cause deterioration of fiberglass and which resists erosion by sulphur bacteria and which sets quickly.

The advantages of the present invention are preferably attained by providing an improved cement product comprising a thermoplastic cement product made of 5–35% of inorganic materials containing no carbonaceous material which have been pulverized to approximately 10 micron size and combined at a temperature of about 300° F. with 65–95% of molten sulphur to form a colloidal mass of sulphur with partly amorphous particles.

Accordingly, it is an object of the present invention to provide improved construction materials.

Another object of the present invention is to provide improved cement and concrete products.

An additional object of the present invention is to provide improved cement and concrete products having very high compressive strength.

A further object of the present invention is to provide improved cement and concrete products which do not cause deterioration of fiberglass.

Another object of the present invention is to provide improved cement and concrete products which resists erosion by sulphur bacteria.

An additional object of the present invention is to provide improved cement and concrete products having very high compressive strength which do not cause deterioration of fiberglass and which resist erosion by sulphur bacteria and which set quickly.

A specific object of the present invention is to provide improved cement and concrete products comprising a thermoplastic cement product made of 5–35% of inorganic materials containing no carbonaceous material which have been pulverized to approximately 10 micron size and combined at a temperature of about 300° F. with 65–95% of molten sulphur to form a colloidal mass of sulphur with partly amorphous particles.

These and other objects and features of the present invention will be apparent from the following detailed description, taken with reference to the figures of the accompanying drawing.

DETAILED DESCRIPTION OF THE INVENTION

Figure 1:
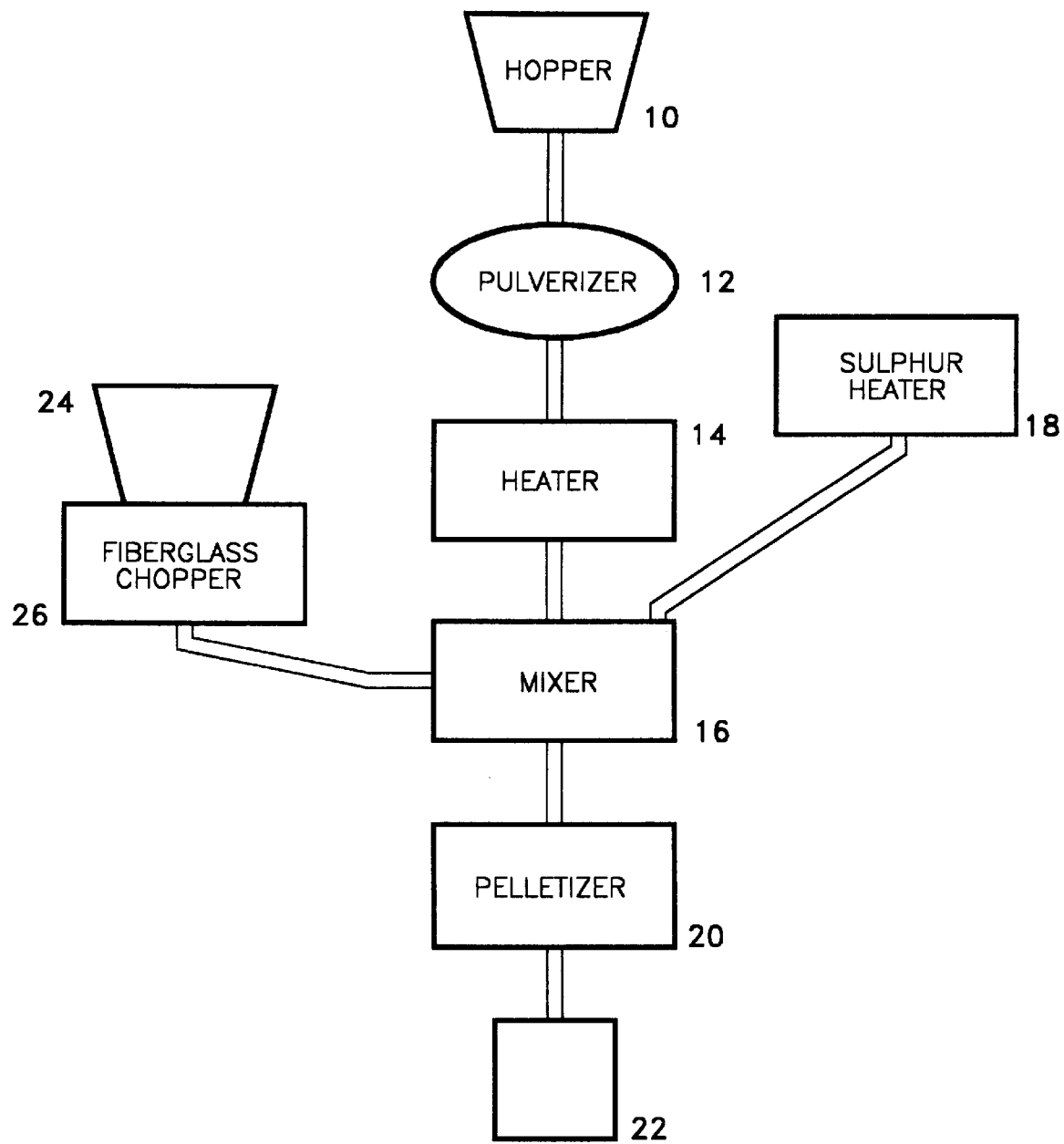
FIG. 1 is a diagrammatic representation showing the method of producing cement products embodying the present invention.

My invention has solved the two main objections to sulphur polymers used in construction and building products. The primary objection was high cost and the fact that they could not be competitive in cost to portland cement concrete. The second objection was the fact that the sulphur was crystalline in nature and, therefore, brittle in final application. Also, there was another factor and that was achieving high compressive strength while still being competitive in cost. I have been able to achieve these goals by changing my sulphur cement into an inorganic material, rather than an organic material, by polymerization and by removing any carbonaceous material. The main ingredient of my thermoplastic cement is sulphur combined with solids in well defined structures that contain aluminum, silicon and oxygen in their regular framework. Chemically, my formula comprises 43–62% $SiO_2$ (Silica), 15–36% $Al_2O_3$ (Alumina), 0.3–16.0% CaO (Lime), 1.5–9.0% $Fe_2O_3$ (Ferric Oxide), 0.3–4.0% Mg) (Magnesia), 0.01–12.5% $Na_2O$ (Soda) and 0.1–11.4% $K_2O$ (Potash). This combination of materials can be found extensively in sedimentary shale consisting of Montmorillonite, Illite and Kaolin. A preferred formulation is 55.5% $SiO_2$, 25.6% $Al_2O_3$, 5.9% CaO, 5.1% $Fe_2O_3$, 3.4% MgO, 2.3% $Na_2O$, 1.2% $K_2O$ and 0.2% trace of other materials. Coal mine waste is often found to contain these materials.

As seen in FIG. 1, the chemical compound described above is delivered through hopper 10 to a pulverizer 12 which grinds the chemical to a powder of not more than 10 micron size. The powdered material is delivered to a heater 14 where the material is heated to 1900° F. which serves to incinerate any carbonaceous material and converts the remaining material into partially amorphous particles. These particles are delivered to a mixer 16, where they are combined, at a temperature of approximately 300° F., with molten sulphur from sulphur heater 18, in a ratio of approximately 65–95% sulphur to 5–35% particles producing a thermoplastic colloidal mass, which is converted into pellets in pelletizer 20 and is loaded into sacks 22 for delivery. If desired, to increase the tensile strength of the cement, approximately 30% of fiberglass may be delivered through hopper 24 into chopper 26, where the fiberglass is chopped to approximately 6 micron size and, thereafter, is added to the material in mixer 16. A preferred formula for the fiberglass is 43–46% $SiO_2$, 10–13% $Al_2O_3$, 25–30% CaO, 8–11% MgO and 1–2% $Fe_2O_3$.

In use, the sacks 22 of cement pellets can be shipped to a point of use where the pellets will be heated to approximately 250°–300° F. and will be mixed with aggregate to produce thermoplastic concrete. It has been found that mixing approximately 60% crushed recycled asphalt with 40% pellets at a temperature of 300° F. will create road concrete having a compressive strength as high as 7000 psi. It has also been found that agricultural waste, including agricultural wastes from the San Joaquin Valley, California, can be used as a filler for roadway construction, without fear of leaching waste into the ecosystem To accomplish this, approximately 10% waste is ground to approximately 45 microns and is combined with 90% cement pellets. This combination comprises approximately 40% of the roadway material when combined with approximately 60% of recycled asphalt. It should be understood that it is not necessary to incorporate recycled asphalt or waste material into the concrete mixture. When the cement pellets are mixed with new asphalt aggregate, the bitumen or oil waste works as a stabilizer and lubricant to produce higher slump and more efficient placement. In addition, used tires, ground to powder, or Fontana slag, a furnace waste of steel production, can be used with the cement pellets as an aggregate for road construction, with no stability or environmental problems. In addition, the cement pellets can be used, without aggregate, for patching cracks in concrete, filling pot holes and other road repairs. Moreover, the concrete made from the cement pellets is ideally suited to extrusion, as in the manufacture of large pipes. The thermoplastic concrete, made from the cement pellets, does not require any curing and is chemically neutral, having a ph of 7.3. Also, the concrete is not effected by acids, gasoline or oil and, because it is waterproof, it can protect reenforcing rods that must resist bending, compression and tensile strengths. The concrete is thermally insulating and freeze/thaw tests of 300 cycles have revealed no deterioration of the material. It is resistant to marine environments, including marine fungi, and is able to resist sulphur bacteria. It can also be recycled by reheating with increased strength up to five times, after which the strength begins to weaken.

Obviously, numerous other variations and modifications can be made without departing from the spirit of the present invention. Therefore, it should be clearly understood that the forms of the present invention described above and shown in the accompanying drawing are illustrative only and are not intended to limit the scope of the present invention.

What is claimed is:

1. A thermoplastic cement comprising: inorganic materials containing no carbonaceous material combined with molten sulfur wherein said inorganic materials have been pulverized to not more than 10 micron size prior to combining with said molten sulfur.

2. The cement of claim 1 wherein:
   approximately 5–35% of inorganic materials are combined with 65–95% of molten sulphur.

3. The cement of claim 1 wherein:
   said inorganic materials comprise:
   43–62% $SiO_2$ (Silica),
   15–36% $Al_2O_3$ (Alumina),
   0.3–16.0% CaO (Lime),
   1.5–9.0% $Fe_2O_3$ (Ferric Oxide),
   0.3–4.0% MgO (Magnesia),
   0.01–12.5% $Na_2O$ (Soda) and
   0.1–11.4% $K_2O$ (Potash).

4. The cement of claim 1 wherein:
   said inorganic materials are mixed with said sulphur at a temperature of approximately 300° F.

5. The cement of claim 1 wherein:
   said inorganic material comprise:
   55.5% $SiO_2$,
   25.6% $Al_2O_3$,
   5.9% CaO,
   5.1% $Fe_2O_3$,
   3.4% MgO,
   2.3% $Na_2O$,
   1.2% $K_2O$ and
   0.2% trace materials.

6. The cement of claim 1 wherein:
   said inorganic materials have been heated to approximately 1500°–2000° F. prior to mixing with said molten sulphur.

7. The cement of claim 1 further comprising:
   approximately 40% of said cement is mixed with approximately 60% of aggregate to produce a thermoplastic concrete.

8. The concrete of claim 7 wherein:
   said aggregate is recycled asphalt.

9. The concrete of claim 8 wherein:
   said aggregate includes powdered tires.

10. The concrete of claim 8 wherein:
    said aggregate is mixed with said cement at a temperature of approximately 250–300° F.

11. The concrete of claim 7 wherein:
    said 40% cement includes approximately 90% cement and 10% agricultural waste.

12. The concrete of claim 7 wherein:
    said aggregate is steel mill slag.

13. The concrete of claim 7 wherein:
    said aggregate includes powdered tires.

14. The cement of claim 1 further comprising:
    approximately 30% fiberglass.

15. The cement of claim 14 wherein:
    said fiberglass comprises:
    43–46% $SiO_2$,
    10–13% $Al_2O_3$,
    25–30% CaO,
    8–11% MgO,
    1–2% $Fe_2O_3$, and
    1–5% other inorganics.

16. The cement of claim 1 wherein:
    said inorganic materials include zeolites.

17. The method of producing concrete comprising the steps of:
    combining molten sulphur, colloid particles and course aggregate and heating said combination to approximately 1500°–2000°.

18. The method of claim 17 wherein:
    said colloid particles comprise:
    43–62% $SiO_2$ (Silica),
    15–36% $Al_2O_3$ (Alumina),
    0.3–16.0% CaO (Lime),
    1.5–9.0% Fe2o# (Ferric oxide),
    0.3–4.0% Mg Magnesium),
    0.01–12.5% $Na_2O$ (Soda), and
    0.1–11.4% $K_2O$ (Potash).

* * * * *